US010237896B2

(12) United States Patent
Novlan et al.

(10) Patent No.: US 10,237,896 B2
(45) Date of Patent: Mar. 19, 2019

(54) FACILITATION OF NEW RADIO RANDOM ACCESS CHANNELS FOR 5G OR OTHER NEXT GENERATION NETWORK

(71) Applicant: AT&T Intellectual Property I, L.P., Atlanta, GA (US)

(72) Inventors: Thomas Novlan, Austin, TX (US); Salam Akoum, Austin, TX (US); Arunabha Ghosh, Austin, TX (US); Milap Majmundar, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 57 days.

(21) Appl. No.: 15/399,573

(22) Filed: Jan. 5, 2017

(65) Prior Publication Data
US 2018/0192443 A1 Jul. 5, 2018

(51) Int. Cl.
*H04W 4/00* (2018.01)
*H04W 74/08* (2009.01)
(Continued)

(52) U.S. Cl.
CPC ... *H04W 74/0833* (2013.01); *H04W 72/0453* (2013.01); *H04W 76/11* (2018.02); *H04W 76/15* (2018.02)

(58) Field of Classification Search
CPC ......... H04W 72/0453; H04W 74/0833; H04W 76/15; H04W 76/11; H04W 24/10; H04W 76/021; H04W 76/025
See application file for complete search history.

(56) References Cited

U.S. PATENT DOCUMENTS

2015/0188650 A1  7/2015  Au et al.
2016/0183322 A1  6/2016  Huang
(Continued)

FOREIGN PATENT DOCUMENTS

WO   2016072717 A1   5/2016
WO   2016072791 A1   5/2016
(Continued)

OTHER PUBLICATIONS

Andres-Maldonado et al., "Reduced M2M Signaling Communications in 3GPP LTE and Future 5G Cellular Networks," 2016 Wireless Days (WD), 2016, IEEE, 3 pages.
(Continued)

*Primary Examiner* — Minh Trang T Nguyen
(74) *Attorney, Agent, or Firm* — Amin, Turocy & Watson, LLP

(57) ABSTRACT

The random access channel procedure for new radio NR can be designed to support multiple use cases with various requirements. The NR physical layer can support the independent configuration of resources used for the random access channel (RACH) procedures that can be transparent to user equipment (UE) devices and independent from resources configured for the UE. For instance, in the case of a standalone NR the RACH configuration can be obtained by the UE by either signaling on the NR carrier or fixed within the telecommunications standard. While in the case of non-standalone NR the RACH configuration can be obtained by the UE by broadcast or dedicated signaling on a different carrier than the NR carrier (e.g. a Long Term Evolution carrier).

20 Claims, 12 Drawing Sheets

(51) Int. Cl.
 *H04W 72/04* (2009.01)
 *H04W 76/11* (2018.01)
 *H04W 76/15* (2018.01)

(56) References Cited

U.S. PATENT DOCUMENTS

2018/0092085 A1* 3/2018 Shaheen ............. H04W 72/048
2018/0092139 A1* 3/2018 Novlan ................ H04W 76/12

FOREIGN PATENT DOCUMENTS

| WO | 2016117981 A1 | 7/2016 |
| WO | 2016148454 A1 | 9/2016 |
| WO | 2016165127 A1 | 10/2016 |
| WO | 2016169058 A1 | 10/2016 |
| WO | 2016169059 A1 | 10/2016 |
| WO | 2016195735 A1 | 12/2016 |

OTHER PUBLICATIONS

Polese et al., "Performance Comparison of Dual Connectivity and Hard Handover for LTE-5G Tight Integration," Proceedings of the 9th EAI International Conference on Simulation Tools and Techniques, 2016, ICST (Institute for Computer Sciences, Social-Informatics and Telecommunications Engineering), 6 pages.

* cited by examiner

FACILITATION OF NEW RADIO RANDOM ACCESS CHANNELS FOR 5G OR OTHER NEXT GENERATION NETWORK

TECHNICAL FIELD

This disclosure relates generally to facilitating random access for new radios. For example, this disclosure relates to facilitating a new radio random access channel for a 5G, or other next generation network, air interface.

BACKGROUND

5th generation (5G) wireless systems represent a next major phase of mobile telecommunications standards beyond the current telecommunications standards of $4^{th}$ generation (4G). Rather than faster peak Internet connection speeds, 5G planning aims at higher capacity than current 4G, allowing higher number of mobile broadband users per area unit, and allowing consumption of higher or unlimited data quantities. This would enable a large portion of the population to stream high-definition media many hours per day with their mobile devices, when out of reach of wireless fidelity hotspots. 5G research and development also aims at improved support of machine-to-machine communication, also known as the Internet of things, aiming at lower cost, lower battery consumption and lower latency than 4G equipment.

The above-described background relating to a non-orthogonal design is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
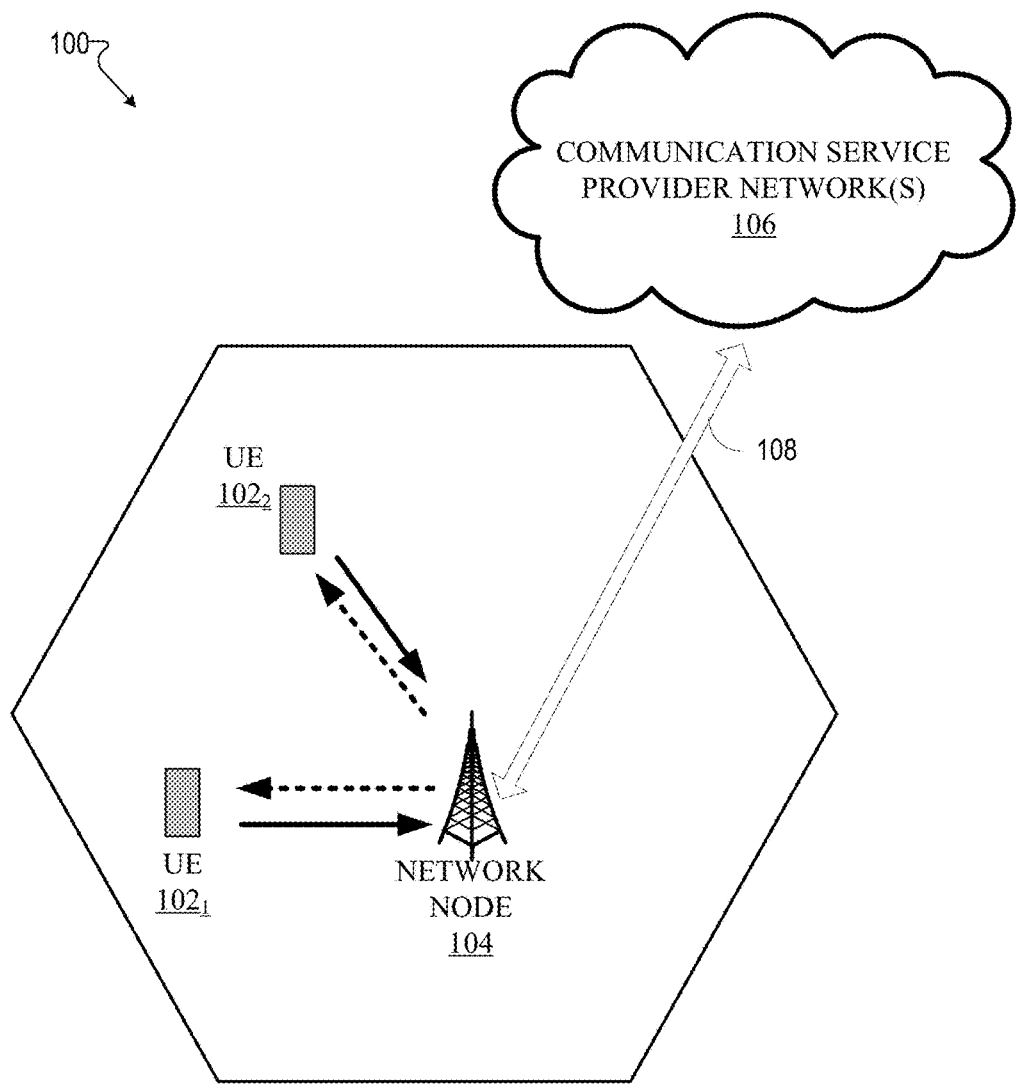
FIG. 1 illustrated is an example wireless communication system in which a network node and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate new radio random access channels for a 5G or other next generation networks. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate random access channels for a 5G network. Facilitating random access channels for a 5G network can be implemented in connection with any type of device with a connection to the communications network (e.g., a mobile handset, a computer, a handheld device, etc.) any Internet of things (IOT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. Note that the terms element, elements and antenna ports can be interchangeably used but carry the same meaning in this disclosure. The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception.

In some embodiments the non-limiting term radio network node or simply network node is used. It can refer to any type of network node that serves UE is connected to other network nodes or network elements or any radio node from where UE receives a signal. Examples of radio network nodes are Node B, base station (BS), multi-standard radio (MSR) node such as MSR BS, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

Cloud radio access networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with, or take the place of policy and charging rules function ("PCRF") network elements so that policies such as quality of service and traffic management and routing can be synchronized and managed end to end.

To meet the huge demand for data centric applications, 4G standards can be applied to 5G, also called new radio (NR) access. 5G networks can comprise the following: data rates of several tens of megabits per second supported for tens of thousands of users; 1 gigabit per second can be offered simultaneously to tens of workers on the same office floor; several hundreds of thousands of simultaneous connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

A random access channel (RACH) procedure for NRs can be designed to support multiple use cases with different requirements by leveraging a unified framework just as regular access user equipment (UE). It should be understood for purposes of this disclosure that RACH refers to RACH for NR design and procedure as opposed to existing LTE RACH. An NR physical layer can support mechanisms the independent configuration of resources used for the RACH procedure that, from a UE perspective, can be transparent and independent from resources configured for the UE. In case of a standalone NR, the RACH configuration can be obtained by the UE by either signaling on an NR carrier (e.g. NR broadcast channel) or the radio access standard (e.g., 3GPP).

In case of non-standalone NR deployment, the UE is expected to perform an initial access to the wireless network on LTE first, followed by NR. In the aforementioned case, LTE-assisted RACH can be beneficial for the UE. A partition (distinguishing sets of physical resources) and preambles (unique identifiers) can be indicated by UE-specific (LTE) radio resource control (RRC) configuration or cell-specific broadcast signaling (e.g. LTE system information broadcast (SIB)) for both a regular and a simplified (2-step) NR RACH procedure.

NR can be deployed as a standalone (SA) radio access technology or as a non-standalone (NSA) radio access technology. LTE, which is widely deployed can provide seamless coverage and uninterrupted connectivity. Although NR can provide significantly increased data rates and/or new services NR deployment can be limited within hotspots under the footprint of LTE. Scenarios for NSA NR deployments can comprise homogeneous architectures (macro only or pico only) and heterogeneous architectures (macro+pico).

As stated above, in the case of NSA NR deployment, the UE can perform the initial access on LTE first, followed by NR. Therefore, LTE-assisted RACH can be beneficial to the UE, especially when NR is deployed in mmWave with LTE as the anchor layer. When the NR is deployed in mmWave, although the NR can have a high frequency, the NR can still facilitate transmissions for UEs specifically connected to the NR. Alternatively, it could be better for a UE to maintain an LTE connection for better coverage to configure and/or acquire resources. Consequently, a significant reduction in complexity at the UE and overhead in the network can be achieved by configuring only resources (time/frequency/beam(space)) relevant for the UEs which are connected to the NR using LTE signaling.

NSA can be designed to be compatible with future deployment of SA NR and other use cases which can be introduced in future phases of the NR standards. RACH design for NR integrated access and backhaul (IAB) can support multiple use cases with different requirements, including backhaul connection establishment between relay transmission points (rTPs) with a single unified framework as the regular access UE. RTPs can be NR base stations that have the ability to transmit signals of the NR as well as the UEs. Although the rTPs can act as a relay between the NR and UE, the network can perform an independent configuration to distinguish between the rTP and the UE due to the different physical resources. While the physical channels and signals used for random access allocated for UEs can be reused in the case of backhaul links, differentiation of resources between access and backhaul links can be beneficial.

Resource differentiation can avoid collision of transmissions between UEs and rTPs and allow for the support of random access between rTPs of different hop orders, which are subject to a half-duplex constraint. For instance, in some cases a preamble collision can exist when two UEs pick the same preamble during a random access procedure. However, resource differentiation can facilitate a contention resolution for the UEs.

The NR physical layer can also support mechanisms for the independent configuration of resources used for the random access procedure. From the UE perspective independent configuration of resources can be transparent and independent from resources configured for the UE. In the case of SA NR, the NR RACH configuration can be obtained by the UE by either signalling on the NR carrier (e.g. NR broadcast channel) or fixed in the 3GPP specification. While in the case of non-standalone NR the NR RACH configuration can be obtained by the UE by broadcast or dedicated signaling on a different carrier than the NR carrier (e.g. a LTE carrier).

One mechanism for allowing the differentiation of rTP initial access to the network and UE initial access to the network is to have different RACH physical resources (e.g. time/frequency/beam(space)) and preambles utilized by rTPs other than those physical resources utilized by the UEs and indicate the preambles via LTE-assistance signaling.

The partition, or sets of physical resources and preambles can be indicated by UE-specific (LTE) RRC configuration or cell-specific broadcast signaling (e.g. LTE SIB). The partition or sets of preambles can be configured based on use case (e.g. access vs. backhaul-specific and/or fixed vs. mobility-specific). The partition or sets of preambles can also be linked to different sets of physical RACH resources and the configuration can be implicitly indicated based on the configured RACH resources.

The RACH configuration provided by LTE-assistance signaling can also indicate different UE reporting configurations or messages to be utilized in the RACH procedure including, but not limited to: beam measurement reports (e.g., # of beam IDs, beam RS configuration, time/frequency resources for uplink (UL) beam-based measurements or link to downlink (DL) beam-based measurement configuration), RACH procedure indication (e.g., regular or simplified (2-step)), and/or UE transmission power (e.g., RACH power ramping configuration or power control parameters).

It is expected that the regular RACH procedure would need to be supported for UEs performing random access for the first time in a network/cell or as fallback if the connection is lost. However, for scenarios comprising connected or inactive UEs with LTE-assistance data, a simplified procedure, such as an LTE-assisted 2-Step RACH for NR, can be leveraged. Another use case for the LTE-assisted 2-Step RACH for NR can comprise an IAB where the backhaul links need to be maintained, but mobility is limited (or not supported).

The LTE-assisted 2-Step RACH procedure can reduce latency and network overhead, by step 1: transmitting a RACH preamble and/or message containing configured UE identification during UL. Additionally, the transmission can contain a beam recovery request or measurement reports. Thereafter, at step 2: a connection comprising a timing advance (TA) can be established during a DL and/or UL transmission grant. The LTE-assistance information can be UE-specific (e.g. RRC configuration), cell-specific (e.g. LTE-SIB) or a combination of both.

The RACH preamble and/or resources used for 2-step RACH can be different from those used for a regular RACH procedure. The UE can receive the identification (ID) (or set of IDs from which it can select) to be used when performing RACH on NR via the LTE-assistance signaling. Timing information (e.g. TA can be explicitly indicated or implicitly derived from an LTE-configured TA. Beam-related configurations can comprise a UL-beam index for Step 1, a DL-beam index for Step 2, or a DL/UL beam index pair to be used for 2-step RACH. The 2-step RACH message configuration can comprise presence or absence of measurement reports.

In one embodiment, described herein is a method comprising sending a first signal transmission to a mobile device, and in response to receiving a second signal transmission from the mobile device, facilitating a connection between the mobile device and a radio resource control of the wireless network. The method further comprises, in response to the facilitating, generating random access channel configuration data associated with a first configuration of a random access channel of the wireless network, wherein the random access channel configuration data comprises reporting configuration data associated with a second configuration of the random access channel for reporting by the mobile device. Additionally, the method comprises sending the random access channel configuration data to the mobile device.

According to another embodiment, a system can facilitate transmitting a first signal to a mobile device via a first network device of network devices of a wireless network, transmitting a second signal to the mobile device via the first network device of the network devices of the wireless network, and in response to the transmitting the first signal and the transmitting the second signal, facilitating transmitting a third signal from a radio device to the mobile device. In response to the facilitating, the system can facilitate transmitting the third signal, and facilitate transmitting random access channel data, representative of a random access channel identification of a random access channel of the wireless network, from the mobile device to the radio device. The system can further comprise, in response to the facilitating the transmitting the random access channel data, facilitating transmitting response data, representative of a response based on the random access channel data, from the radio device to the mobile device, and in response to the facilitating the transmitting the response data, facilitating transmitting mobile device identification data, representative of the mobile device, from the mobile device to the radio device. Consequently, in response to the facilitating the transmitting the mobile device identification data, the system can facilitate establishing a connection between the mobile device and the radio device.

According to yet another embodiment, described herein is a machine-readable storage medium that can perform the operations comprising transmitting a first signal to a mobile device via a first network device of network devices of a wireless network, transmitting a second signal to the mobile device via the first network device, and in response to the transmitting of the first signal and the second signal, sending a first instruction to establish a radio resource control connection between the first network device and the mobile device. The operations can further comprise, in response to the sending the first instruction, facilitating transmitting a third signal to the mobile device. Furthermore, the operations can comprise, in response to the facilitating the transmitting of the third signal, facilitating transmitting identification data, representative of an identification of the mobile device, and random access channel data, representative of a random access channel of the wireless network, to a second network device of the network devices of the wireless network. Consequently, based on the identification data and the random access channel data, the operations can comprise sending a second instruction to establish a connection between the second network device and the mobile device.

These and other embodiments or implementations are described in more detail below with reference to the drawings.

FIG. 1 illustrates an example wireless communication system 100 in accordance with various aspects and embodiments of the subject disclosure. In example embodiments, system 100 is or comprises a wireless communication network serviced by one or more wireless communication network providers. In example embodiments, system 100 can comprise one or more user equipment (UEs) 102 (e.g., 1021, 1022 . . . 102n), which can comprise one or more antenna panels comprising vertical and horizontal elements. A UE 102 can be any user equipment device, such as a mobile phone, a smartphone, a cellular enabled laptop (e.g., comprising a broadband adapter), a tablet computer, a wearable device, a virtual reality (VR) device, a heads-up display (HUD) device, a smart car, a machine-type communication (MTC) device, and the like. UE 102 can also comprise IOT devices that can communicate wirelessly. UE 102 roughly corresponds to the mobile station (MS) in global system for mobile communications (GSM) systems. Thus, the network node 104 (e.g., network node device) can provide connectivity between the UE and the wider cellular network and can facilitate wireless communication between the UE and the wireless communication network (e.g., the one or more communication service provider networks 106, described in more detail below) via a network node 104. The UE 102 can send and/or receive communication data wirelessly to the network node 104. The dashed arrow lines from the network node 104 to the UE 102 represent downlink (DL) communications and the solid arrow lines from the UE 102 to the network nodes 104 represent uplink (UL) communications.

The non-limiting term network node (e.g., network node device) can be used herein to refer to any type of network node serving a UE 102 and/or connected to other network nodes, network elements, or another network node from which the UE 102 can receive a radio signal. In typical cellular radio access networks (e.g., universal mobile telecommunications system (UMTS) networks), they can be referred to as base transceiver stations (BTS), radio base station, radio network nodes, base stations, NodeB, eNodeB (e.g., evolved NodeB), etc.). In 5G terminology, the node can be referred to as a gNodeB (e.g., gNB) device. Network nodes can also comprise multiple antennas for performing various transmission operations (e.g., MIMO operations). A network node can comprise a cabinet and other protected enclosures, an antenna mast, and actual antennas. Network nodes can serve several cells, also called sectors, depending on the configuration and type of antenna. Examples of network nodes (e.g., network node 104) can include but are not limited to: NodeB devices, base station (BS) devices, access point (AP) devices, and radio access network (RAN) devices. The network node 104 can also include multi-standard radio (MSR) radio node devices, comprising: an MSR BS, an eNode B, a network controller, a radio network controller (RNC), a base station controller (BSC), a relay, a donor node controlling relay, a base transceiver station (BTS), a transmission point, a transmission node, an RRU, an RRH, nodes in distributed antenna system (DAS), and the like.

System 100 can further comprise one or more communication service provider networks 106 that facilitate providing wireless communication services to various UEs, comprising UE 102, via the network node 104 and/or various additional network devices (not shown) included in the one or more communication service provider networks 106. The one or more communication service provider networks 106 can include various types of disparate networks, comprising: cellular networks, femto networks, picocell networks, microcell networks, internet protocol (IP) networks Wi-Fi service networks, broadband service network, enterprise networks, cloud based networks, and the like. For example, in at least one implementation, system 100 can be or can comprise a large scale wireless communication network that spans various geographic areas. According to this implementation, the one or more communication service provider networks 106 can be or can comprise the wireless communication network and/or various additional devices and components of the wireless communication network (e.g., additional network devices and cells, additional UEs, network server devices, etc.). The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

In one technique, the UE 102 can send a reference signal back to the network node 104. The network node 104 takes a received reference signal from the UE 102, estimates the condition of the channel, which can be influenced by various factors, such as objects in the line of sight, weather, movement, interference, etc., and after correcting for more issues (e.g., interference), adjusts the beamforming rates for each antenna transmitting to the UE 102, and changes parameters, so as to transmit a better beam toward the UE 102. This ability to select MIMO schemes and use beamforming to focus energy and adapt to changing channel conditions can allow for higher data rates.

Figure 2:
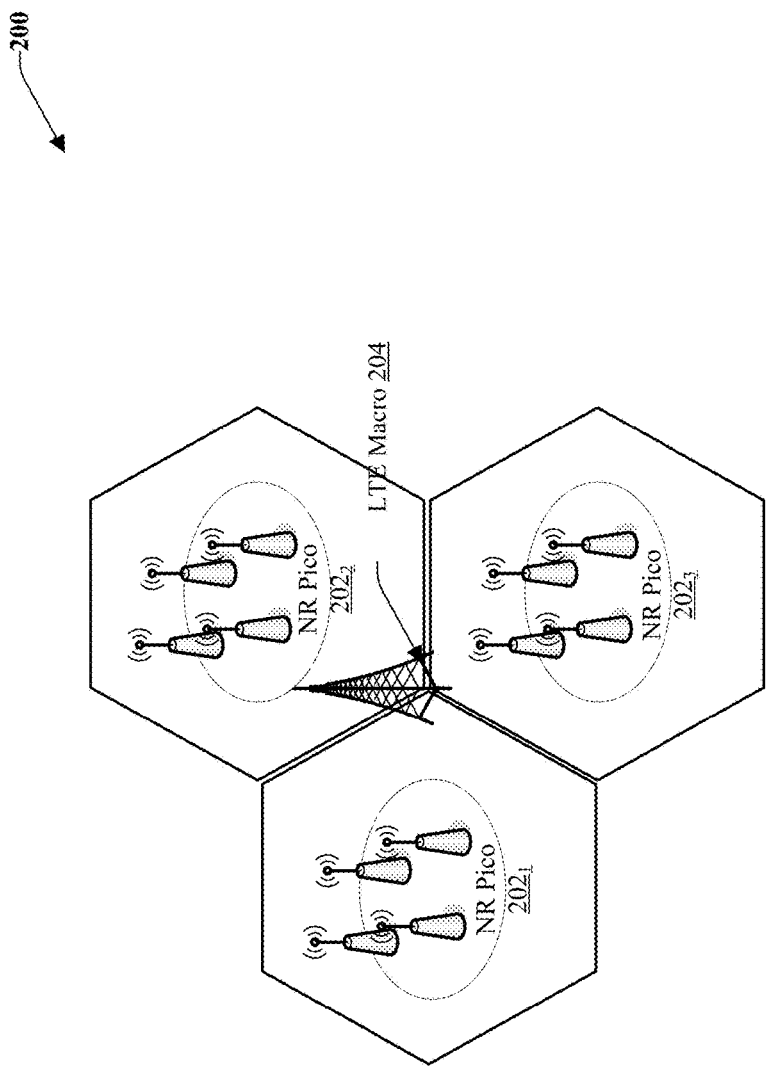
FIG. 2 illustrates an example schematic system block diagram of LTE on a macro infrastructure and NR on a pico infrastructure according to one or more embodiments.

Referring now to FIG. 2, illustrated is an example schematic system block diagram of LTE on a macro infrastructure and NR on a pico infrastructure. FIG. 2 depicts the case where LTE 204 can be deployed as large coverage on macro network sites 200. However, for heavy mobility network traffic situations, NR $202_1$, $202_2$, $202_3$ can be deployed on smaller sites, such as, so that wide area coverage can be provided via NR $202_1$, $202_2$, $202_3$ hot spots.

Figure 3:
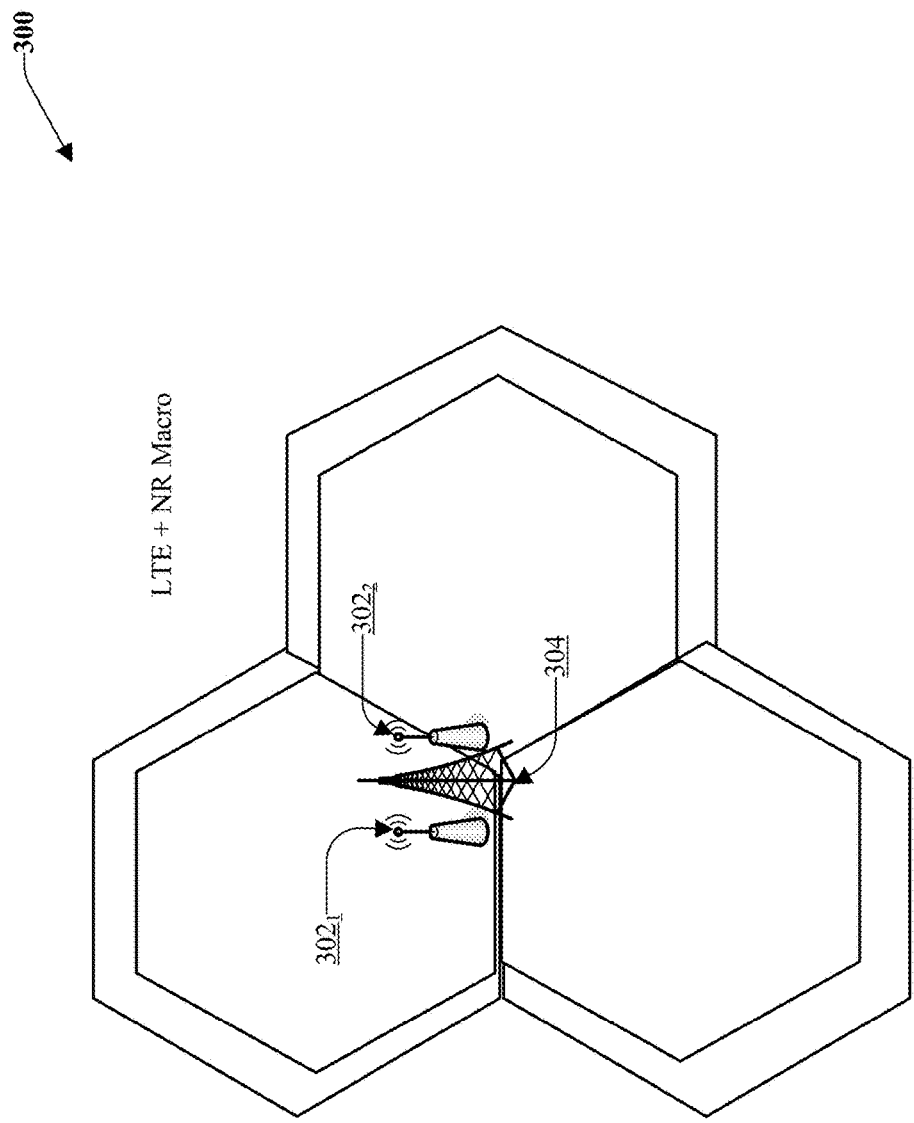
FIG. 3 illustrates an example schematic system block diagram of LTE on a macro network and NR on the macro network according to one or more embodiments.

Referring now to FIG. 3, illustrated is an example schematic system block diagram of LTE 304 on a macro network 300 and NR $302_1$, $302_2$ on the macro network 300. FIG. 3 depicts LTE 304 and NR $302_1$, $302_2$, on the macro network 300, which can be useful for facilitating different frequency bands. Since NR $302_1$, $302_2$ can provide new services for mobile devices, deploying both LTE 304 and NR $302_1$, $302_2$ on the macro network 300 can generate additional network efficiencies.

Figure 4:
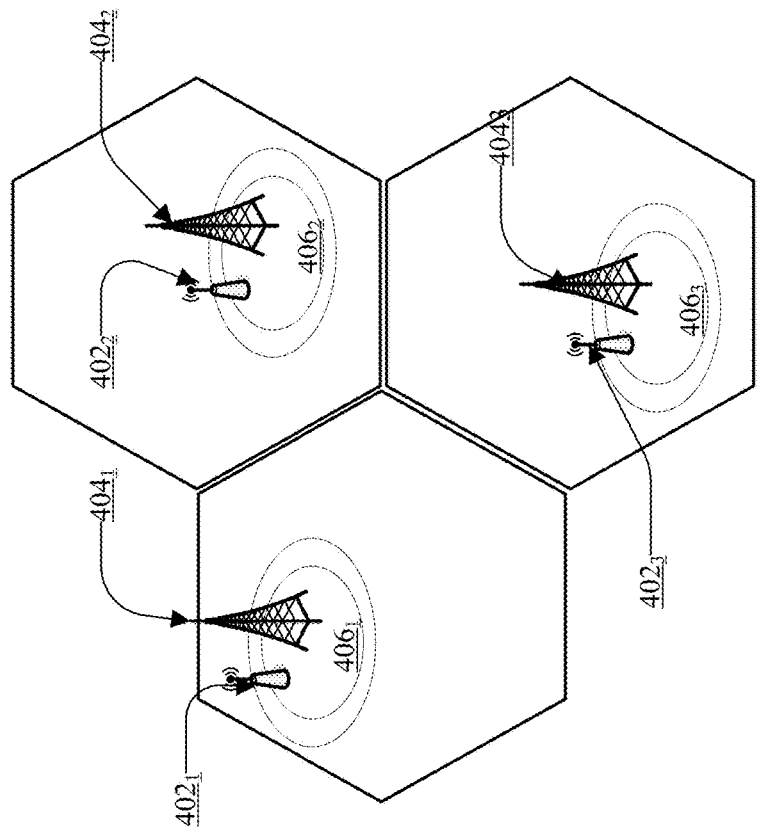
FIG. 4 illustrates an example schematic system block diagram of NR deployed on a pico network and LTE deployed on the pico network according to one or more embodiments.

Referring now to FIG. 4, illustrated is an example schematic system block diagram of NR $402_1$, $402_2$, $402_3$, deployed on a pico network $406_1$, $406_2$, $406_3$ and LTE $404_1$, $404_2$, $404_3$ deployed on the pico network $406_1$, $406_2$, $406_3$. FIG. 4 depicts both NR and LTE deployed on the pico network $406_1$, $406_2$, $406_3$. This architecture can be useful for dense hot spots or indoor deployment where LTE $404_1$, $404_2$, $404_3$ provides the control plane while the NR $402_1$, $402_2$, $402_3$ provides the data service.

Figure 5:
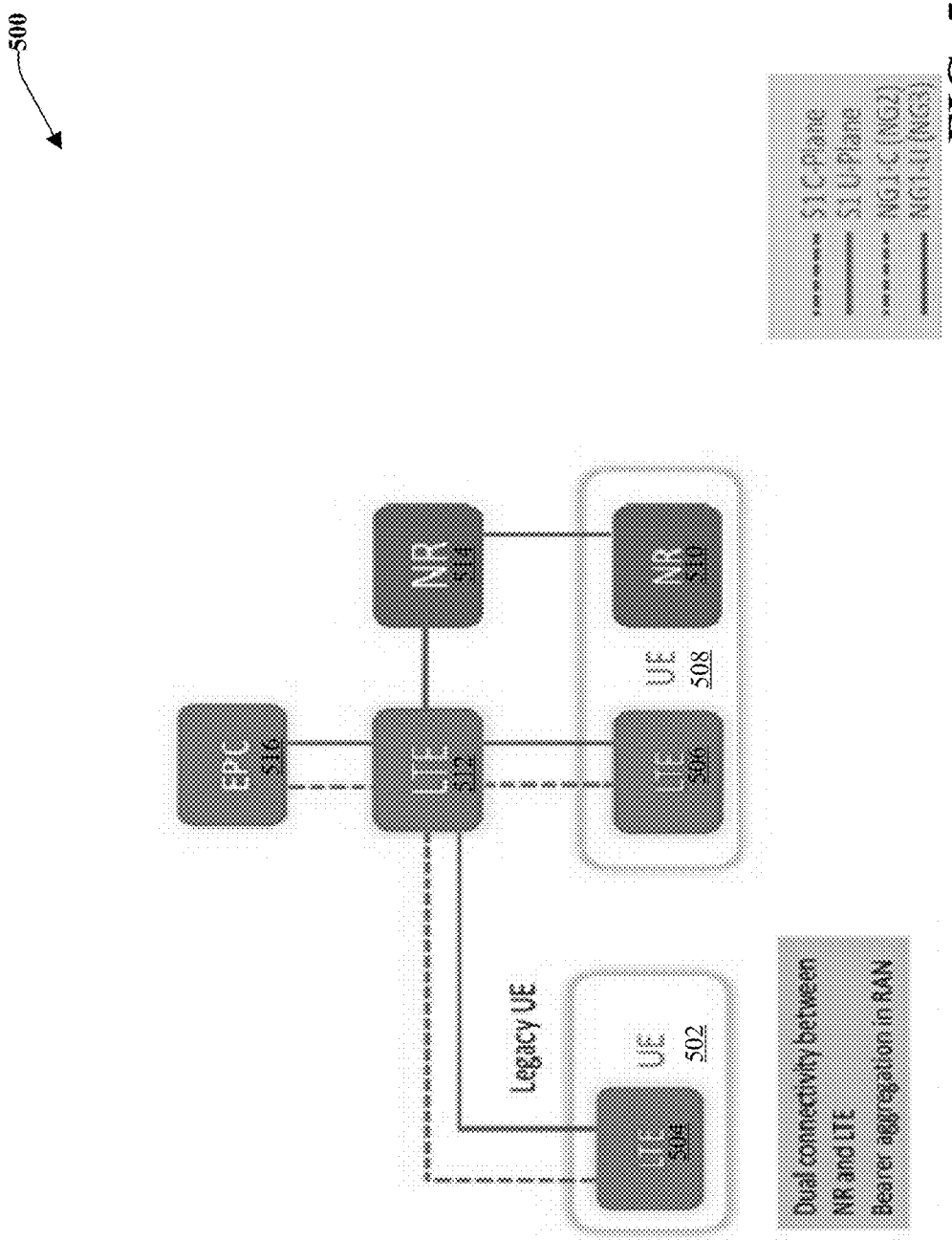
FIG. 5 illustrates an example schematic system block diagram of a non-standalone new radio according to one or more embodiments.

Referring now to FIG. 5 illustrated is an example schematic system block diagram of a non-standalone new radio according to one or more embodiments. The network system 500 can comprise UEs 502, 508. The UE 502 can comprise an LTE radio 504 to allow communication with the LTE device 512 via LTE compliant protocol denoted as the S1 C-Plane (control plane) and the S1 U-Plane (data plane). Therefore, the UE 502 can communicate with an evolved packet core 516 (EPC) (e.g., the core network that LTE connects to for authentication and internet access). Alternatively, the UE 508 can comprise an LTE radio 506 and a NR radio 510. The LTE radio 606 can allow communication with the LTE device 512 via LTE compliant protocol denoted as the S1 C-Plane (control plane) and the S1 U-Plane (data plane). Additionally, the UE 508 can communicate with the NR device 514 via the NR 510 over a NR data plane denoted as NG1-U. Essentially, the legacy UE 502 comprising the LTE radio 504 can only communicate via LTE whereas the UE 508 comprising the LTE radio 506 and the NR radio 510 can transmit data over LTE and/or NR. It should be noted that FIG. 5 depicts the case of single connectivity between the NR device 514 and the NR radio 510 where the control plane functions are sent via LTE (e.g., between LTE radio 506 and LTE device 512). However, the case (not depicted) does exist where the control plane functions can be sent via NR (e.g., between NR radio 510 and NR device 514).

Figure 6:
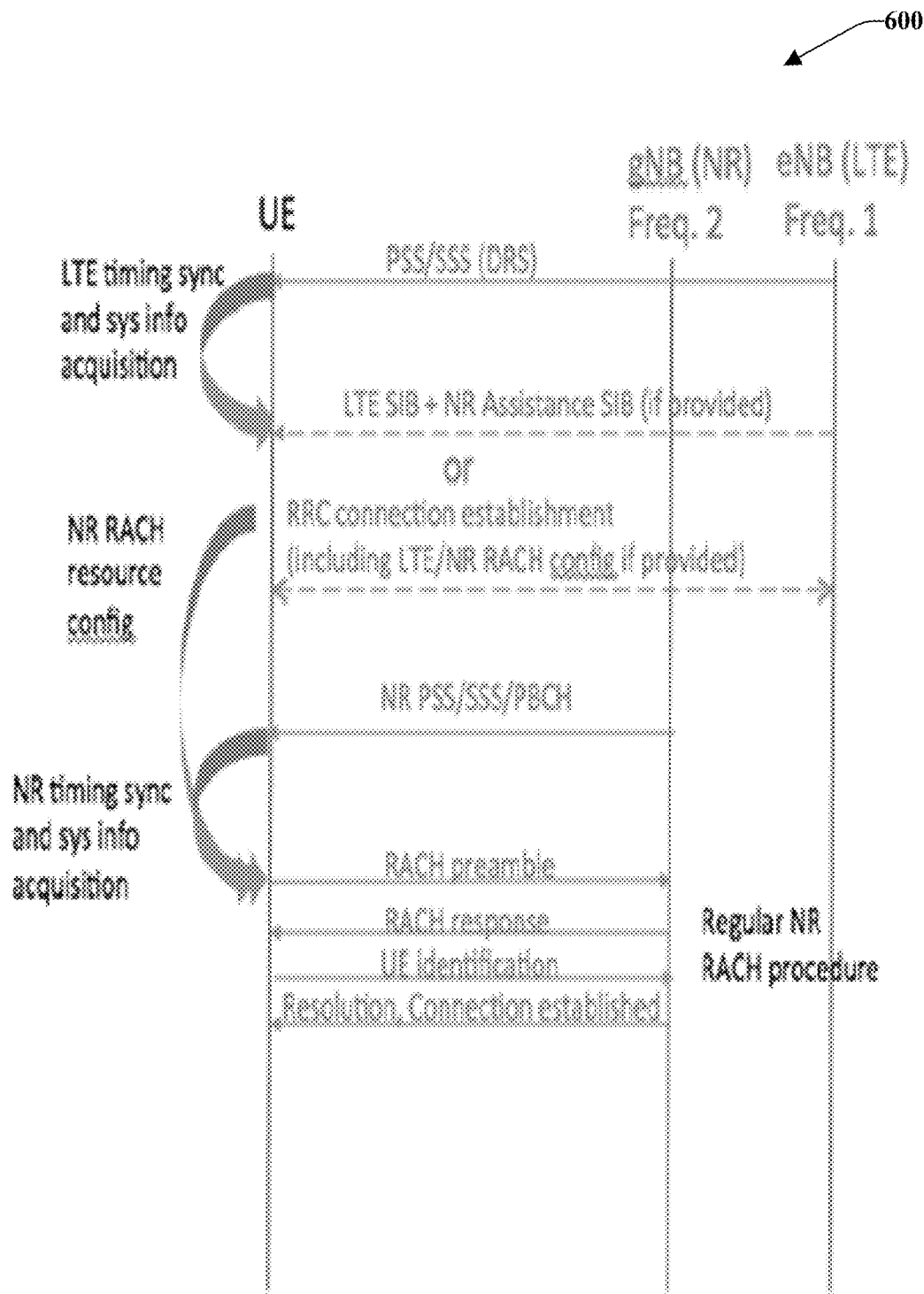
FIG. 6 illustrates an example schematic system block diagram of an LTE-assisted NR RACH procedure according to one or more embodiments.

Referring now to FIG. 6, illustrated is an example schematic system block diagram of an LTE-assisted NR RACH procedure 600 according to one or more embodiments. During the LTE-assisted NR RACH procedure, the LTE device 512 can send a signal to a UE 508. The signal can be a primary synchronization signal (PSS), a secondary synchronization signal (SSS), and/or a discovery reference signal (DRS). The signal can be sent to idle UEs or UEs that are already connected to the network. Although the PSS and the SSS leverage a fixed timing, the DRS timing can be configured by the network. The LTE device 512 can also send LTE system information broadcast (SIB) plus NR assistance SIB to the UE 508, or if the UE 508 is already connected to the network (e.g., has already sent an acknowledgment to the LTE device 512), then the LTE device 512 can send a UE 508 specific radio resource control (RRC) message to the UE 508, which takes advantage of a dedicated connection between the LTE device 512 and the UE 508. The dedicated connection can allow for an RRC connection to be established comprising LTE and/or NR RACH configuration transmissions. This procedure allows LTE timing synchronization and LTE system information to be acquired by the UE 508.

In response to the aforementioned communications between the LTE device 512 and the UE 508, the NR device 514 can send an PSS, SSS, and/or primary broadcast channel (PBCH) data to the UE 508 to facilitate NR timing synchronization and system information acquisition by the UE 508. The UE 508 can then send a RACH preamble to the NR device 514. In return, the NR device 514 can send a RACH response message to the UE 508, prompting the UE 508 to send UE 508 identification data to the NR device 514. Consequently, the NR device 514 can establish a connection with the UE 508. Alternatively, if there is a preamble collision due to two UEs picking the same preamble, the NR device 514 can perform contention resolution prior to establishing a connection with the UE 508.

Figure 7:
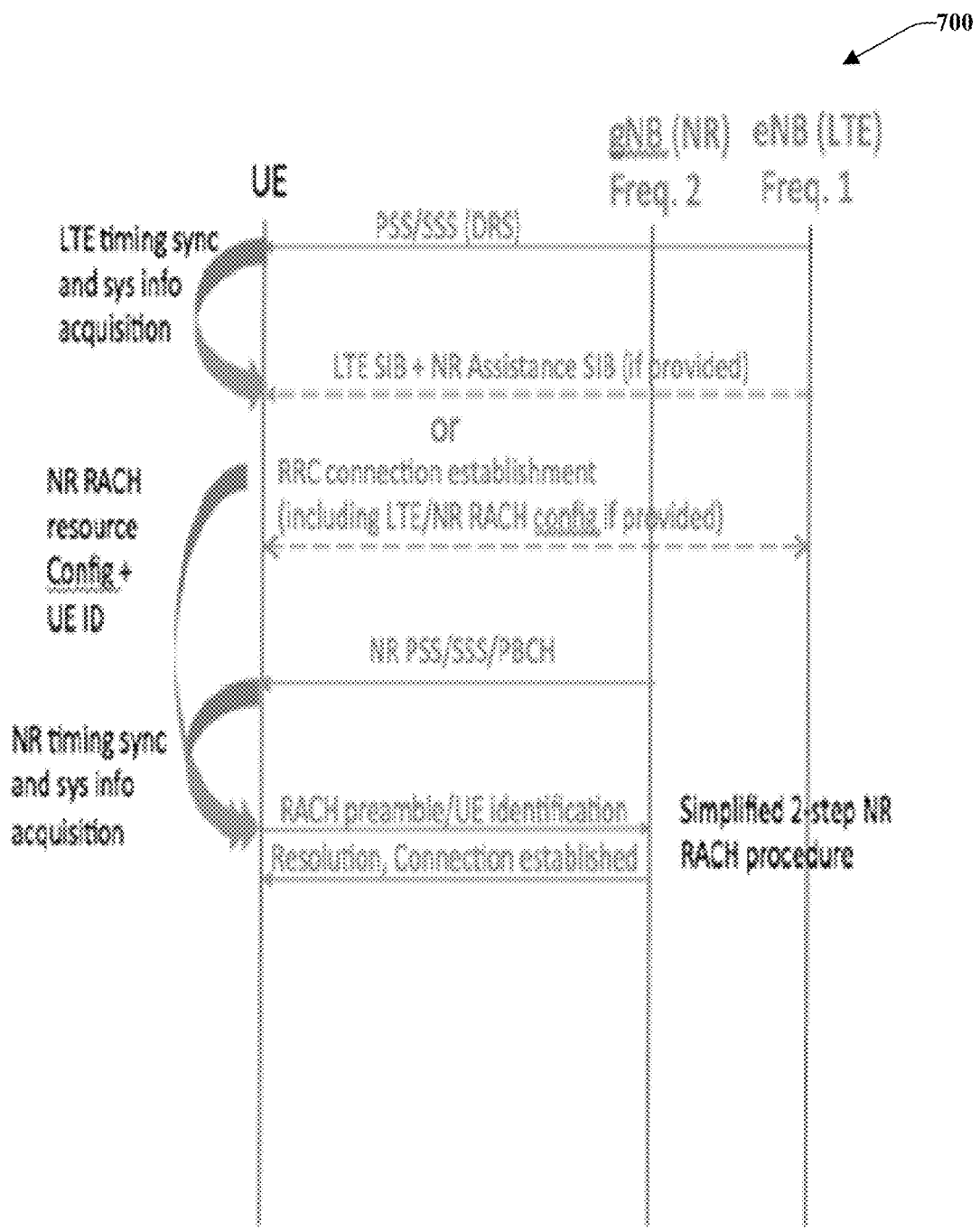
FIG. 7 illustrates an example schematic system block diagram of an LTE-assisted 2-step RACH procedure according to one or more embodiments.

Referring now to FIG. 7, illustrated is an example schematic system block diagram of an LTE-assisted 2-step RACH procedure 700 according to one or more embodiments. The LTE-assisted 2-step RACH procedure 700 can be more efficient than the LTE-assisted NR RACH procedure due to the elimination and/or combination of data transmission between the UE 508 and the NR device 514. Accordingly, the LTE device 512 can send a signal to a UE 508. The signal can be a primary synchronization signal (PSS), a secondary synchronization signal (SSS), and/or a discovery reference signal (DRS). The signal can be sent to idle UEs or UEs that are already connected to the network. Although the PSS and the SSS leverage a fixed timing, the DRS timing can be configured by the network. The LTE device 512 can also send LTE system information broadcast (SIB) plus NR assistance SIB to the UE 508, or if the UE 508 is already connected to the network (e.g., has already sent an acknowledgment to the LTE device 512), then the LTE device 512 can send a UE 508 specific radio resource control (RRC) message to the UE 508, which takes advantage of a dedicated connection between the LTE device 512 and the UE 508. The dedicated connection can allow for an RRC connection to be established comprising LTE and/or NR RACH configuration transmissions. This procedure allows NR RACH resource configuration data and UE 508 identification data to facilitate an increased system efficiency by reducing the steps of the LTE-assisted NR RACH procedure.

In response to the aforementioned communications between the LTE device 512 and the UE 508, the NR device 514 can send an PSS, SSS, and/or primary broadcast channel (PBCH) data to the UE 508 to facilitate NR timing synchronization and system information acquisition by the UE 508. The UE 508 can then send a RACH preamble and UE 508 identification data, to the NR device 514, in the same transmission. In return, the NR device 514 can establish a connection with the UE 508. Alternatively, if there is a preamble collision due to two UEs picking the same preamble, the NR device 514 can perform contention resolution prior to establishing a connection with the UE 508.

Figure 8:
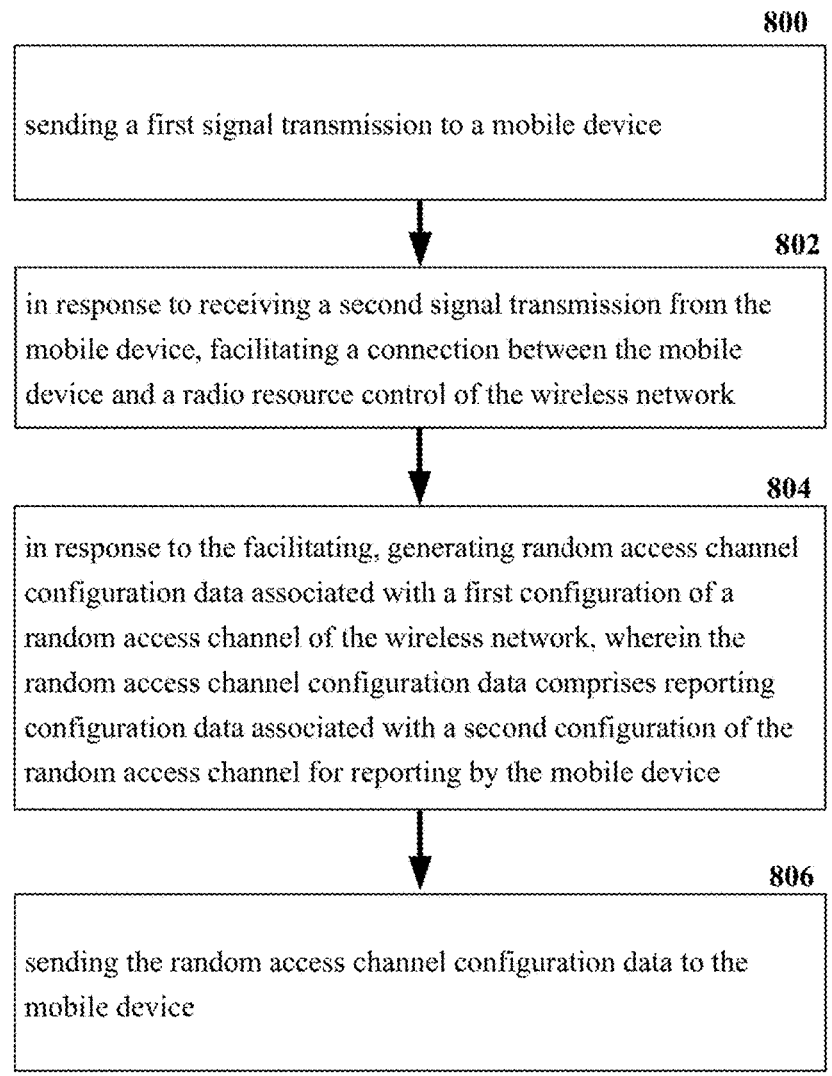
FIG. 8 illustrates an example flow diagram for RACH facilitation for a 5G network according to one or more embodiments.

Referring now to FIG. 8, illustrated is an example flow diagram for RACH facilitation for a 5G network according to one or more embodiments. At element 800, a method can comprise sending a first signal transmission to a mobile device (e.g., UE 508). At element 802, in response to receiving a second signal transmission from the mobile device (e.g., UE 508), facilitating a connection between the mobile device (e.g., by UE 508) and a radio resource control of the wireless network. In response to the facilitating, at element 804, the method can generate random access channel configuration data associated with a first configuration of a random access channel of the wireless network, wherein the random access channel configuration data comprises reporting configuration data associated with a second configuration of the random access channel for reporting by the mobile device (e.g., UE 508). Consequently, at element 806, the method can comprise sending the random access channel configuration data to the mobile device (e.g., UE 508).

Figure 9:
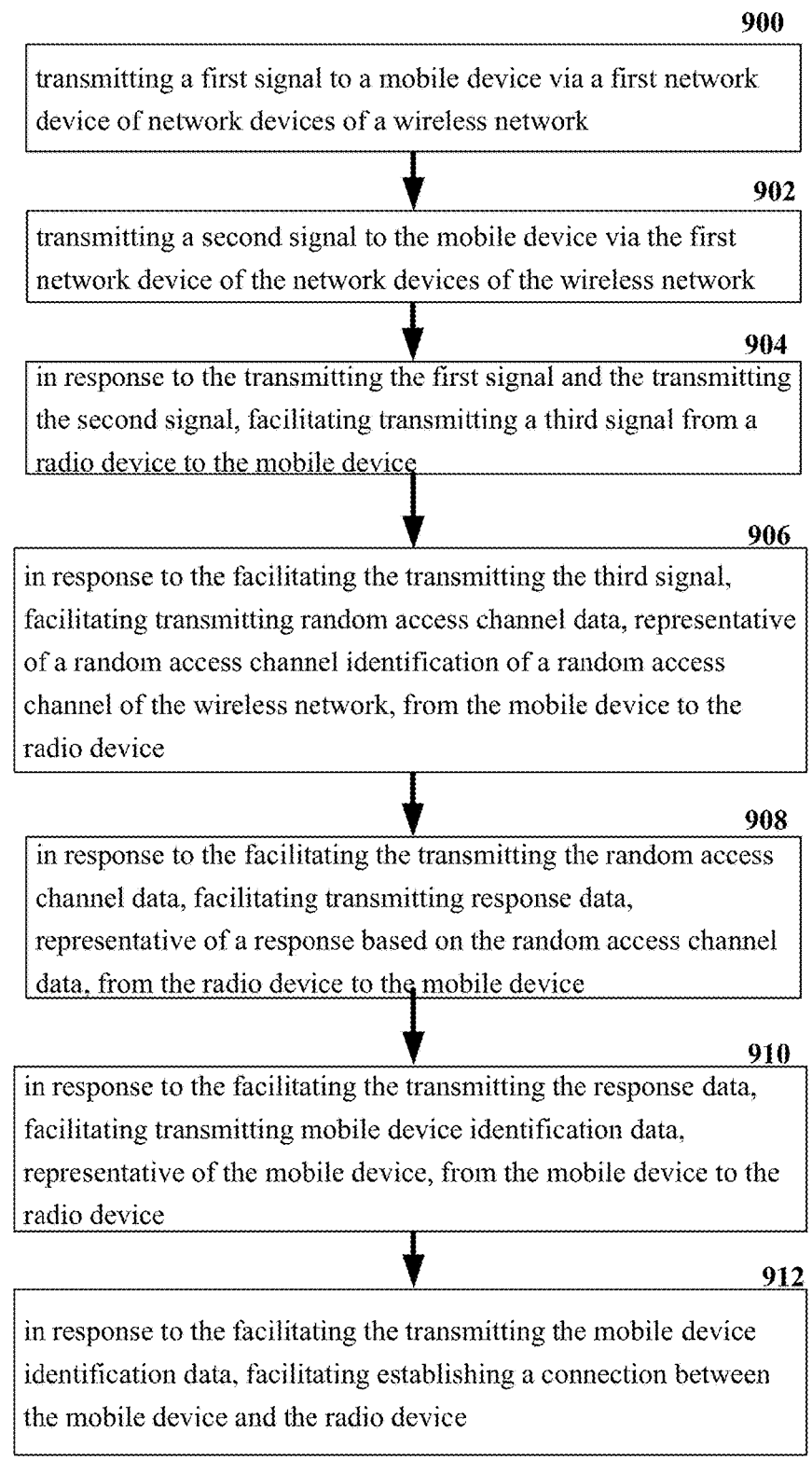
FIG. 9 illustrates an example flow diagram for an LTE-assisted NR RACH procedure for a 5G network according to one or more embodiments.

Referring now to FIG. 9, illustrates an example flow diagram for an LTE-assisted NR RACH procedure for a 5G network according to one or more embodiments. At element 900, a first signal can be transmitted to a mobile device (e.g., UE 508) via a first network device (e.g., LTE device 512) of network devices of a wireless network, and at element 902, a second signal can be transmitted to the mobile device (e.g., UE 508) via the first network device (e.g., LTE device 512) of the network devices of the wireless network. In response to the transmitting the first signal and the transmitting the second signal, at element 904, the system can facilitate transmitting a third signal from a radio device (e.g., NR device 514) to the mobile device (e.g., UE 508). In response to the facilitating the transmitting the third signal, at element 906, the system can facilitate transmitting random access channel data, representative of a random access channel identification of a random access channel of the wireless network, from the mobile device (e.g., UE 508) to the radio device (e.g., NR device 514). In response to the facilitating the transmitting the random access channel data, at element 908, the system can facilitate transmitting response data, representative of a response based on the random access channel data, from the radio device (e.g., NR device 514) to the mobile device (e.g., UE 508). At element 910, in response to the facilitating the transmitting the response data, the system can facilitate transmitting mobile device identification data, representative of the mobile device (e.g., UE 508), from the mobile device (e.g., UE 508) to the radio device (e.g., NR device 514). Thus, at element 912, in response to the facilitating the transmitting the mobile device (e.g., UE 508) identification data, the system can facilitate establishing a connection between the mobile device (e.g., UE 508) and the radio device (e.g., NR device 514).

Figure 10:
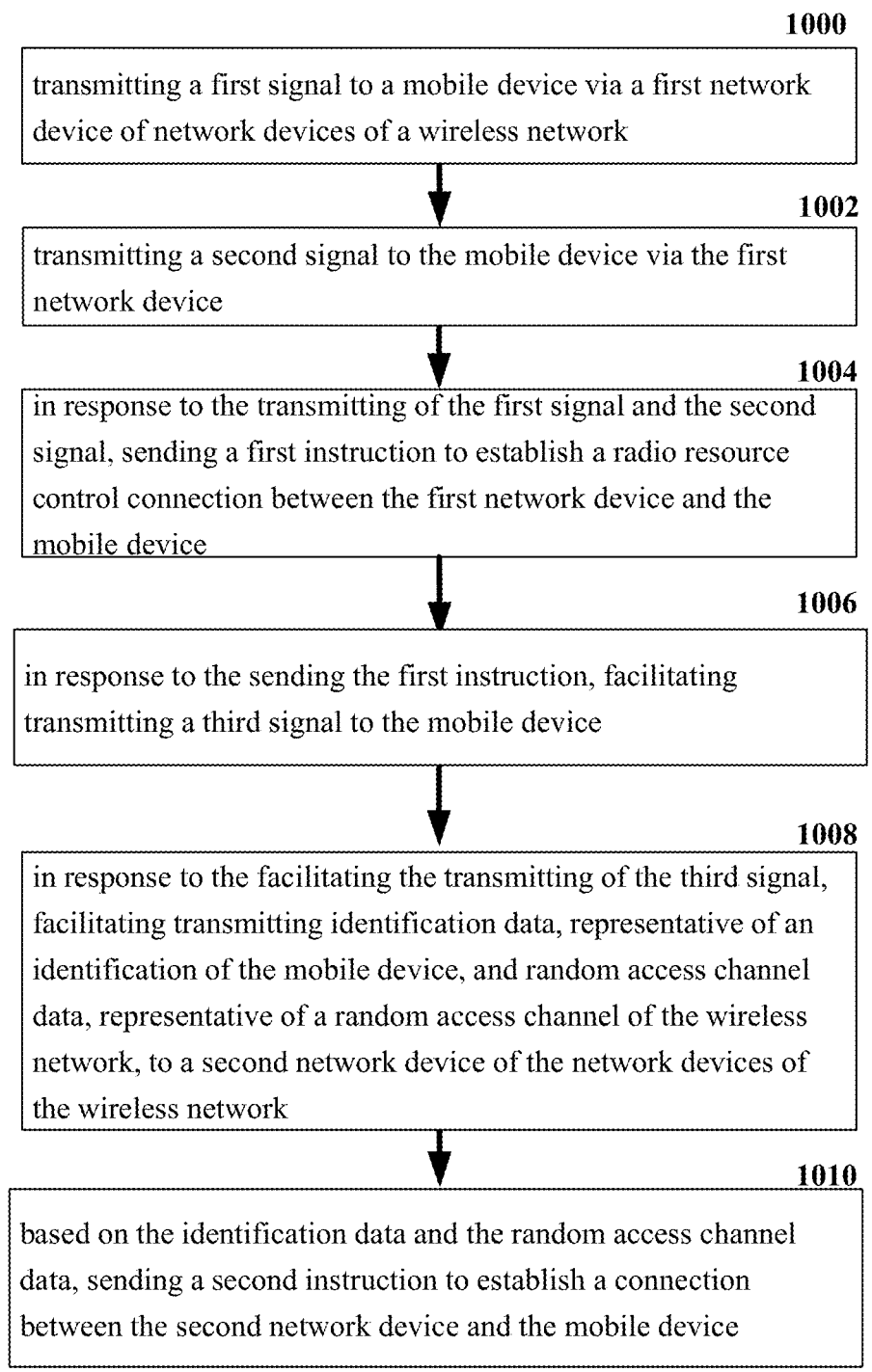
FIG. 10 illustrates an example flow diagram for an LTE-assisted 2-step RACH procedure for a 5G network according to one or more embodiments.

Referring now to FIG. 10, illustrated is an example flow diagram for an LTE-assisted 2-step RACH procedure for a 5G network according to one or more embodiments. At element 1000, a first signal can be transmitted to a mobile device (e.g., UE 508) via a first network device (e.g., LTE device 512) of network devices of a wireless network, and at element 1002, a second signal can be transmitted to the mobile device (e.g., UE 508) via the first network device (e.g., LTE device 512). In response to the transmitting of the first signal and the second signal, a first instruction can be sent at element 1004 to establish a radio resource control connection between the first network device (e.g., LTE device 512) and the mobile device (e.g., UE 508). In response to the sending the first instruction, at element 1006, the operations can comprise transmitting a third signal (e.g., NR device 514) to the mobile device (e.g., UE 508). Furthermore, at element 1008, in response to the facilitating the transmitting of the third signal, the operations can comprise facilitating transmitting identification data, representative of an identification of the mobile device (e.g., UE 508), and random access channel data, representative of a random access channel of the wireless network, to a second network device (e.g., NR device 514) of the network devices of the wireless network. Thus, based on the identification data and the random access channel data, a second instruction can be sent to establish a connection between the second network device (e.g., NR device 514) and the mobile device (e.g., UE 508) at element 1010.

Figure 11:
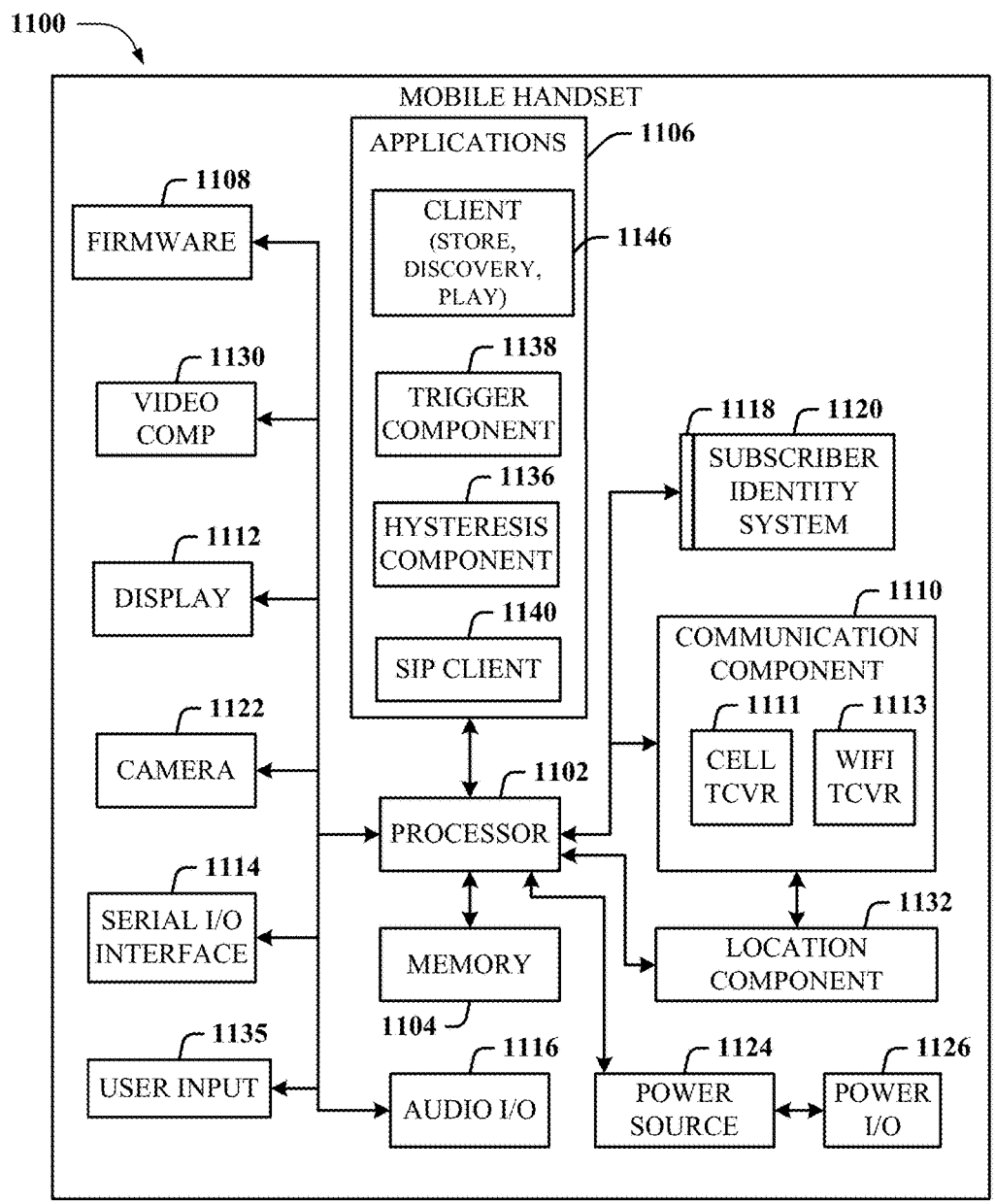
FIG. 11 illustrates an example block diagram of an example mobile handset operable to engage in a system architecture that facilitates secure wireless communication according to one or more embodiments described herein.

Referring now to FIG. 11, illustrated is a schematic block diagram of an exemplary end-user device such as a mobile device 1100 capable of connecting to a network in accordance with some embodiments described herein. Although a mobile handset 1100 is illustrated herein, it will be understood that other devices can be a mobile device, and that the mobile handset 1100 is merely illustrated to provide context for the embodiments of the various embodiments described herein. The following discussion is intended to provide a brief, general description of an example of a suitable environment 1100 in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1100 includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can also include a suitable cellular transceiver 1111 (e.g., a GSM transceiver) and/or an unlicensed transceiver 1113 (e.g., Wi-Fi, WiMax) for corresponding signal communications. The handset 1100 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks.

The handset 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1394) through a hard-wire connection, and other serial input devices (e.g., a keyboard, keypad, and mouse). This supports updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the handset 1100, and updated by downloading data and software.

The handset 1100 can process IP data traffic through the communication component 1110 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1122 (e.g., a camera) can be provided for decoding encoded multimedia content. The video processing component 1122 can aid in facilitating the generation, editing and sharing of video quotes. The handset 1100 also includes a power source 1124 in the form of batteries and/or an AC power subsystem, which power source 1124 can interface to an external power system or charging equipment (not shown) by a power I/O component 1126.

The handset 1100 can also include a video component 1130 for processing video content received and, for recording and transmitting video content. For example, the video component 1130 can facilitate the generation, editing and sharing of video quotes. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touch screen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1138 when the Wi-Fi transceiver 1113 detects the beacon of the access point. A SIP client 1140 enables the handset 1100 to support SIP protocols and register the subscriber with the SIP registrar server. The applications 1106 can also include a client 1142 that provides at least the capability of discovery, play and store of multimedia content, for example, music.

The handset 1100, as indicated above related to the communications component 810, includes an indoor network radio transceiver 1113 (e.g., Wi-Fi transceiver). This function supports the indoor radio link, such as IEEE 802.11, for the dual-mode GSM handset 1100. The handset 1100 can accommodate at least satellite radio services through a handset that can combine wireless voice and digital radio chipsets into a single handheld device.

Figure 12:
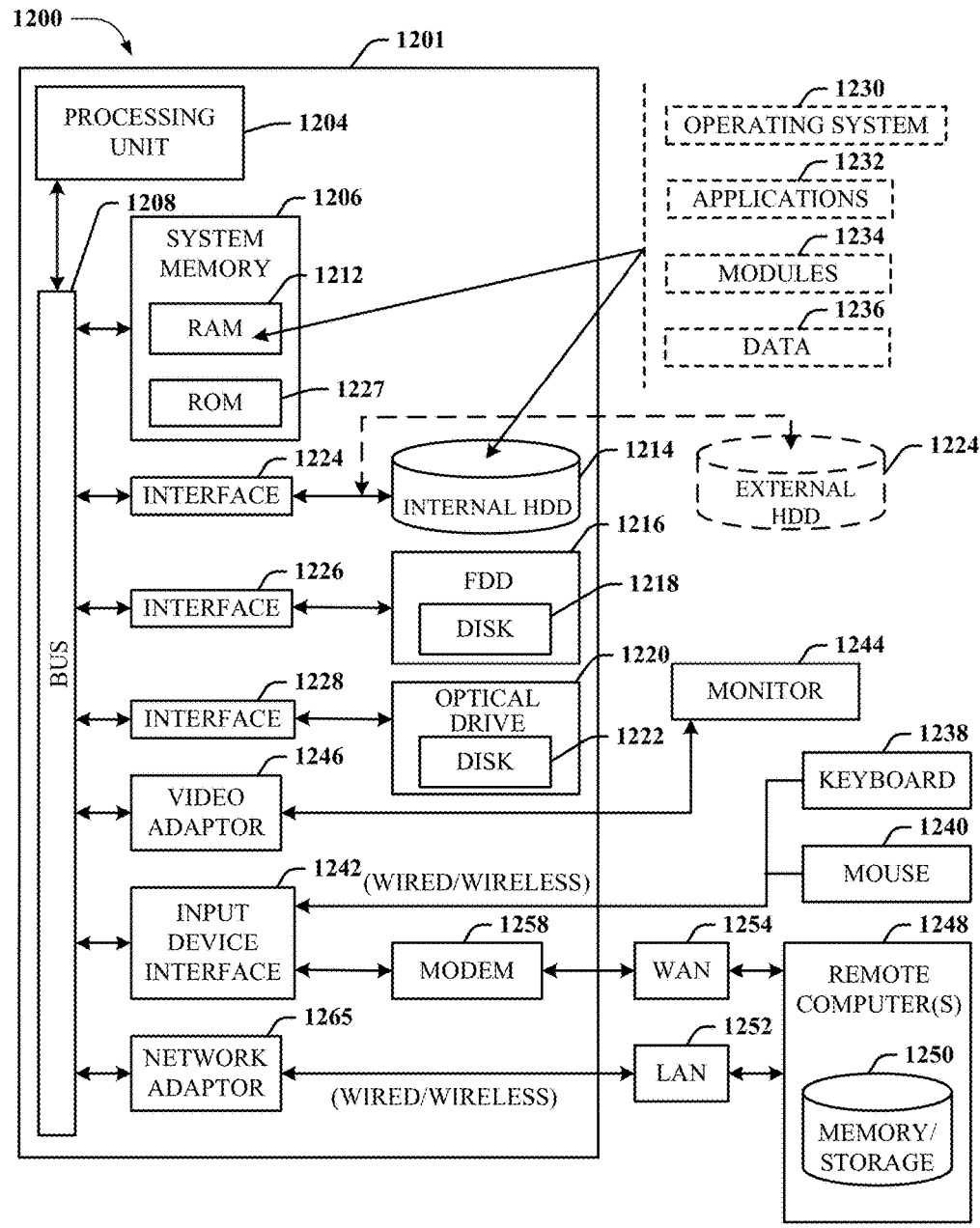
FIG. 12 illustrates an example block diagram of an example computer operable to engage in a system architecture that facilitates secure wireless communication according to one or more embodiments described herein.

Referring now to FIG. 12, there is illustrated a block diagram of a computer 1200 operable to execute a system architecture that facilitates establishing a transaction between an entity and a third party. The computer 1200 can provide networking and communication capabilities between a wired or wireless communication network and a server (e.g., Microsoft server) and/or communication device. In order to provide additional context for various aspects thereof, FIG. 12 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 12, implementing various aspects described herein with regards to the end-user device can include a computer 1200, the computer 1200 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes read-only memory (ROM) 1227 and random access memory (RAM) 1212. A basic input/output system (BIOS) is stored in a non-volatile memory 1227 such as ROM, EPROM, EEPROM, which BIOS contains the basic routines that help to transfer information between elements within the computer 1200, such as during start-up. The RAM 1212 can also include a high-speed RAM such as static RAM for caching data.

The computer 1200 further includes an internal hard disk drive (HDD) 1214 (e.g., EIDE, SATA), which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1294 interface technologies. Other external drive connection technologies are within contemplation of the subject innovation.

The drives and their associated computer-readable media provide nonvolatile storage of data, data structures, computer-executable instructions, and so forth. For the computer 1200 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1200, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is to be appreciated that the innovation can be implemented with various commercially available operating systems or combinations of operating systems.

A user can enter commands and information into the computer 1200 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 2394 serial port, a game port, a USB port, an IR interface, etc.

A monitor 1244 or other type of display device is also connected to the system bus 1208 through an interface, such as a video adapter 1246. In addition to the monitor 1244, a computer 1200 typically includes other peripheral output devices (not shown), such as speakers, printers, etc.

The computer 1200 can operate in a networked environment using logical connections by wired and/or wireless communications to one or more remote computers, such as a remote computer(s) 1248. The remote computer(s) 1248 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1200 is connected to the local network 1252 through a wired and/or wireless communication network interface or adapter 1256. The adapter 1256 may facilitate wired or wireless communication to the LAN 1252, which may also include a wireless access point disposed thereon for communicating with the wireless adapter 1256.

When used in a WAN networking environment, the computer 1200 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 through the input device interface 1242. In a networked environment, program modules depicted relative to the computer, or portions thereof, can be stored in the remote memory/storage device 1250. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11

(a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10 BaseT wired Ethernet networks used in many offices.

An important aspect of 5G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
sending, by a network device of a wireless network and comprising a processor, a first signal transmission to a mobile device;
in response to receiving a second signal transmission from the mobile device, facilitating, by the network device, a first connection between the mobile device and a radio resource control of the wireless network;
in response to the facilitating, generating, by the network device, random-access channel configuration data associated with a first configuration of a random-access channel of the wireless network, wherein the random-access channel configuration data comprises reporting configuration data associated with a second configuration of the random-access channel for reporting by the mobile device, and wherein the random-access channel configuration data comprises advance timing data associated with a second connection to be established between the network device and the mobile device; and
sending, by the network device, the random-access channel configuration data to the mobile device.

2. The method of claim 1, wherein the first signal transmission comprises control plane function data that defines a function of a control plane of the wireless network.

3. The method of claim 2, wherein the second signal transmission facilitates data plan management via a radio device.

4. The method of claim 1, further comprising:
sending, by the network device, a control plane function of the wireless network via the second signal transmission.

5. The method of claim 1, further comprising:
in response to the sending the random-access channel configuration data to the mobile device, facilitating, by the network device, a third connection of the mobile device to a radio device of the wireless network.

6. The method of claim 5, further comprising:
in response to the facilitating the third connection, configuring, by the network device, a network resource associated with the mobile device.

7. The method of claim 6, wherein the network resource is a frequency resource associated with a frequency of the mobile device.

8. A system, comprising:
a processor; and
a memory that stores executable instructions that, when executed by the processor, facilitate performance of operations, comprising:
transmitting a first signal to a mobile device via a network device of network devices of a wireless network;
transmitting a second signal to the mobile device via the network device of the network devices of the wireless network;
in response to the transmitting the first signal and the transmitting the second signal, facilitating transmitting a third signal from a radio device to the mobile device;
in response to the facilitating the transmitting the third signal, facilitating transmitting random-access channel data, representative of a random-access channel identification of a random-access channel of the wireless network, from the mobile device to the radio device, wherein the random-access channel data comprises advance timing data associated with a connection to be established between the mobile device and the radio device;
in response to the facilitating the transmitting the random-access channel data, facilitating transmitting response data, representative of a response based on the random-access channel data, from the radio device to the mobile device;
in response to the facilitating the transmitting the response data, facilitating transmitting mobile device identification data, representative of the mobile device, from the mobile device to the radio device; and
in response to the facilitating the transmitting the mobile device identification data, facilitating establishing a connection between the mobile device and the radio device.

9. The network device of claim 8, wherein the operations further comprise:
partitioning access resource data associated with access resources and backhaul link data associated with backhaul link resources.

10. The network device of claim 8, wherein the operations further comprise:
partitioning initial access data associated with a first access of a radio transmission point device to the wireless network and second initiation data associated with a second access of the mobile device to the wireless network.

11. The network device of claim 10, wherein the partitioning comprises utilizing a physical resource for the radio transmission point device, and wherein the physical resource is not utilized for the mobile device.

12. The network device of claim 10, wherein the partitioning comprises utilizing routing data for the radio transmission point device, and wherein the routing data is not utilized by the mobile device.

13. The network device of claim 12, wherein the operations further comprise:
in response to the facilitating the establishing the connection, configuring a radio resource control connection between the mobile device and the radio device.

14. The network device of claim 13, wherein the configuring comprises generating an indication that the routing data is associated with the mobile device.

15. A non-transitory machine-readable storage medium, comprising executable instructions that, when executed by a processor, facilitate performance of operations, comprising:
transmitting a first signal to a mobile device via a first network device of network devices of a wireless network;
transmitting a second signal to the mobile device via the first network device;
in response to the transmitting of the first signal and the second signal, sending a first instruction to establish a radio resource control connection between the first network device and the mobile device;
in response to the sending the first instruction, facilitating transmitting a third signal to the mobile device;
in response to the facilitating the transmitting of the third signal, facilitating transmitting identification data, representative of an identification of the mobile device, and random-access channel data, representative of a random-access channel of the wireless network, to a second network device of the network devices of the wireless network, wherein the random-access channel data comprises advance timing data associated with a connection to be established between the second network device and the mobile device; and
based on the identification data and the random-access channel data, sending a second instruction to establish the connection between the second network device and the mobile device.

16. The non-transitory machine-readable storage medium of claim 15, wherein the operations further comprise:
based on the random-access channel data, configuring routing data associated with the mobile device.

17. The non-transitory machine-readable storage medium of claim 16, wherein the operations further comprise:
associating the routing data with random-access channel resources of the random-access channel.

18. The non-transitory machine-readable storage medium of claim 15, wherein the operations further comprise:
based on backhaul data associated with a backhaul of the wireless network, configuring routing data associated with the mobile device.

19. The non-transitory machine-readable storage medium of claim 15, wherein the random-access channel data comprises reporting configuration data associated with a reporting configuration for the mobile device.

20. The non-transitory machine-readable storage medium of claim 19, wherein the reporting configuration data comprises a setting of a transmission power parameter associated with the mobile device.

* * * * *